United States Patent
Shetty

(10) Patent No.: US 12,063,214 B2
(45) Date of Patent: Aug. 13, 2024

(54) SERVICE AUTHENTICATION THROUGH A VOICE ASSISTANT

(71) Applicant: VMware LLC, Palo Alto, CA (US)

(72) Inventor: Rohit Pradeep Shetty, Bengaluru (IN)

(73) Assignee: VMware LLC, Palo Alto, CA (US)

( * ) Notice: Subject to any disclaimer, the term of this patent is extended or adjusted under 35 U.S.C. 154(b) by 115 days.

(21) Appl. No.: 16/799,867

(22) Filed: Feb. 25, 2020

(65) Prior Publication Data
US 2021/0211421 A1 Jul. 8, 2021

(30) Foreign Application Priority Data
Jan. 2, 2020 (IN) .............................. 202041000114

(51) Int. Cl.
*G10L 17/00* (2013.01)
*G10L 17/06* (2013.01)
(Continued)

(52) U.S. Cl.
CPC .......... *H04L 63/0861* (2013.01); *G10L 17/06* (2013.01); *G10L 17/24* (2013.01);
(Continued)

(58) Field of Classification Search
CPC ............. H04L 63/0861; H04L 63/0838; H04L 63/0846; H04L 63/0853; H04L 63/0823; H04L 63/083; H04L 63/0815; H04L 9/0866; H04L 9/3231; H04L 29/06809; G10L 17/06; G10L 17/24; G10L 25/84;
(Continued)

(56) References Cited

U.S. PATENT DOCUMENTS

| 6,292,896 B1 * | 9/2001 | Guski | H04L 9/3228 713/169 |
| 9,286,899 B1 * | 3/2016 | Narayanan | G06F 21/32 |

(Continued)

FOREIGN PATENT DOCUMENTS

| WO | WO-2016141972 A1 * | 9/2016 | ............. G06F 21/31 |
| WO | 2017131267 A1 | 8/2017 | |

OTHER PUBLICATIONS iMore.com, "What will happen if I delete a device from my iCloud account?" https://forums.imore.com/icloud/345348-what-will-happen-if-i-delete-device-my-icloud-account-html, Oct. 18, 2015 (Year: 2015).
(Continued)

*Primary Examiner* — Douglas Godbold
*Assistant Examiner* — Parker Mayfield
(74) *Attorney, Agent, or Firm* — Kim & Stewart LLP

(57) ABSTRACT

Disclosed are various approaches for authenticating a user through a voice assistant device and creating an association between the device and a user account. The request is associated with a network or federated service. The user can use a client device, such as a smartphone, to initiate an authentication flow. A passphrase is provided to the client device can captured by the client device and a voice assistant device. Audio captured by the client device and voice assistant device can be sent to an assistant connection service. The passphrase and an audio signature calculated from the audio can be validated. An association between the user account and the voice assistant device can then be created.

20 Claims, 5 Drawing Sheets

(51) Int. Cl.
    *G10L 17/24*      (2013.01)
    *G10L 25/84*      (2013.01)
    *H04L 9/40*       (2022.01)

(52) U.S. Cl.
    CPC .......... *G10L 25/84* (2013.01); *H04L 63/0838* (2013.01); *H04L 63/0846* (2013.01); *H04L 63/0853* (2013.01)

(58) Field of Classification Search
    CPC ... H04W 12/06; H04W 12/65; H04N 21/4415
    See application file for complete search history.

(56) References Cited

U.S. PATENT DOCUMENTS

| | | | |
|---|---|---|---|
| 9,928,839 B1* | 3/2018 | Lester | H04L 63/105 |
| 10,063,542 B1* | 8/2018 | Kao | H04L 63/083 |
| 10,158,489 B2* | 12/2018 | Shastri | H04L 63/0853 |
| 10,404,678 B2 | 9/2019 | Grajek et al. | |
| 10,524,092 B2 | 12/2019 | Gandhi et al. | |
| 10,719,591 B1 | 7/2020 | Krieger et al. | |
| 10,748,546 B2 | 8/2020 | Kim et al. | |
| 10,770,092 B1 | 9/2020 | Adams et al. | |
| 10,832,310 B2 | 11/2020 | Isaacson et al. | |
| 10,877,718 B2 | 12/2020 | Gosu et al. | |
| 11,070,949 B2 | 7/2021 | Gross et al. | |
| 2002/0076004 A1 | 6/2002 | Brockenbrough et al. | |
| 2004/0199538 A1 | 10/2004 | Matsuda et al. | |
| 2008/0021997 A1 | 1/2008 | Hinton | |
| 2008/0144944 A1 | 6/2008 | Breed | |
| 2009/0034702 A1 | 2/2009 | Cai | |
| 2010/0031329 A1 | 2/2010 | Kim et al. | |
| 2011/0307790 A1 | 12/2011 | Pandya et al. | |
| 2013/0156194 A1 | 6/2013 | Tanioka | |
| 2013/0179692 A1* | 7/2013 | Tolba | H04L 63/0861 713/179 |
| 2014/0200893 A1 | 7/2014 | Vanjani | |
| 2014/0281547 A1 | 9/2014 | Modzelewski et al. | |
| 2015/0082427 A1 | 3/2015 | Ivanchykhin et al. | |
| 2015/0195406 A1 | 7/2015 | Dwyer et al. | |
| 2015/0244472 A1 | 8/2015 | Poppe et al. | |
| 2016/0119323 A1 | 4/2016 | Krishna | |
| 2016/0224548 A1 | 8/2016 | Massand | |
| 2016/0373490 A1 | 12/2016 | Sedar et al. | |
| 2017/0006044 A1 | 1/2017 | Ezra et al. | |
| 2017/0126640 A1 | 5/2017 | Vincent et al. | |
| 2017/0223613 A1 | 8/2017 | Wang et al. | |
| 2017/0329573 A1 | 11/2017 | Mixter | |
| 2017/0345105 A1 | 11/2017 | Isaacson et al. | |
| 2017/0346949 A1 | 11/2017 | Sanghavi et al. | |
| 2018/0007060 A1 | 1/2018 | Leblang et al. | |
| 2018/0122378 A1 | 5/2018 | Mixter et al. | |
| 2018/0137267 A1 | 5/2018 | Krieger et al. | |
| 2018/0176270 A1 | 6/2018 | Griffin et al. | |
| 2018/0199156 A1 | 7/2018 | Gandhi et al. | |
| 2018/0204187 A1 | 7/2018 | Stewart et al. | |
| 2019/0007381 A1 | 1/2019 | Isaacson et al. | |
| 2019/0116264 A1 | 4/2019 | Sanghavi et al. | |
| 2019/0132321 A1 | 5/2019 | Pitchaimani | |
| 2019/0163896 A1 | 5/2019 | Balaraman et al. | |
| 2019/0306137 A1 | 10/2019 | Isaacson et al. | |
| 2019/0318002 A1 | 10/2019 | Sharma et al. | |
| 2019/0339927 A1 | 11/2019 | Gosu et al. | |
| 2019/0361671 A1 | 11/2019 | Maltsev et al. | |
| 2019/0377898 A1 | 12/2019 | Dunjic et al. | |
| 2020/0084205 A1 | 3/2020 | Bulpin | |
| 2020/0120088 A1 | 4/2020 | Jain et al. | |
| 2020/0134211 A1 | 4/2020 | Miller et al. | |
| 2020/0137053 A1 | 4/2020 | Bhaya et al. | |
| 2020/0228521 A1 | 7/2020 | Edwards et al. | |
| 2020/0349935 A1 | 11/2020 | Smith et al. | |
| 2020/0389314 A1 | 12/2020 | Kunnath et al. | |
| 2021/0058517 A1 | 2/2021 | Serbajlo et al. | |
| 2021/0072951 A1 | 3/2021 | Gosu et al. | |
| 2021/0119794 A1 | 4/2021 | Shpurov et al. | |
| 2021/0176229 A1 | 6/2021 | Xuan et al. | |
| 2021/0306329 A1 | 9/2021 | Conley et al. | |
| 2021/0409955 A1 | 12/2021 | Stuntebeck et al. | |
| 2022/0237273 A1 | 7/2022 | Krieger et al. | |

OTHER PUBLICATIONS

Klein, "How to Remove Devices from Your iCloud Account" https://www.howtogeek.com/240710/how-to-remove-devices-from-your-icloud-account/, Jul. 11, 2017 (Year: 2017).

* cited by examiner

SERVICE AUTHENTICATION THROUGH A VOICE ASSISTANT

RELATED APPLICATIONS

Benefit is claimed under 35 U.S.C. 119(a)-(d) to Foreign Application Serial No. 202041000114 filed in India entitled "SERVICE AUTHENTICATION THROUGH A VOICE ASSISTANT" on Jan. 2, 2020, by VMWARE, Inc., which is herein incorporated in its entirety by reference for all purposes.

CROSS-REFERENCE TO RELATED APPLICATIONS

This application is related to U.S. patent application Ser. No. 16/453,357, filed Jul. 10, 2019 and entitled PROXIMITY BASED AUTHENTICATION OF A USER THROUGH A VOICE ASSISTANT DEVICEA. This application is related to U.S. patent application Ser. No. 16/430,846, filed Jun. 13, 2019 and entitled SERVICE AUTHENTICATION THROUGH A VOICE ASSISTANT. This application is related to U.S. patent application Ser. No. 16/785,682 filed Feb. 10, 2020 and entitled SINGLE SIGN-ON SERVICE AUTHENTICATION THROUGH A VOICE ASSISTANT. All of the above-referenced applications are incorporated herein by reference in their entireties.

BACKGROUND

In an enterprise setting, individuals can utilize a number of different services and applications that are provided by an enterprise. Some of these services are hosted in a third party environment and some can be hosted on servers operated by the enterprise. These individuals can use authentication credentials to login to these application or services. For example, a user might have an email account or an account with a third party customer relationship management service. Accessing data within these services can be accomplished through a device with which the user is authenticated and which may have an authentication token associated with the user's identity. However, a voice assistant device may not have the capability to easily authenticate the user with his or her service endpoints. In addition, the assistant might be in a shared environment, such as in a hotel room, an office environment, or other environments in which multiple people might have access to the device. Providing access to the user's services to the assistant can create various issues.

First, authentication of the user can be a process can be performed using application programming interfaces (APIs) created by the provider of the assistant ecosystem to link a user's identity with a particular assistant device. However, in a shared environment, the user might not wish to permanently link his or her identity with the assistant device. Additionally, in a shared environment, the user might not have the proper privileges authentication credentials to access and modify the linked accounts on the assistant device. Additionally, a user might simply be hesitant to perform a cumbersome process of linking his or her service accounts to an assistant device and then later unlinking the accounts from the device when use of the assistant device is completed. Additionally, an enterprise might wish to control the authentication process with the assistant device rather than rely upon a provider of the assistant ecosystem to do so.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are examples for obtaining data from services on behalf of a user and on behalf of a voice assistant device. A user might have accounts in various services for which access is authenticated using an identity provider service utilized by the user's enterprise. Additionally, a user might wish to authenticate directly with a service endpoint, such as the user's mail server. The user can have an account with the enterprise that deploys an identity provider service to enable single sign-on (SSO) capability for users of the enterprise. The identity provider can verify the user's identity within the enterprise and provide an authentication token that can be used to authenticate the user's access to other services, which may or may not be hosted by the enterprise. For example, a third party conferencing service with which the enterprise provides accounts for its users can authenticate users through an identity provider service.

In an environment in which voice assistant devices are becoming more ubiquitous, providing users access to services provided by the enterprise or directly from service endpoints can be beneficial. However, authenticating users to a SSO portal and/or service endpoints can be challenging. A voice assistant device may not have the capability to easily authenticate the user with his or her service endpoints. In addition, the assistant device might be in a shared environment, such as in a hotel room, an office environment, or other environments in which multiple people might have access to the device. Therefore, examples of this disclosure can enable a persistent authentication of users with a SSO portal or directly with a service endpoint through a voice assistant device. Additionally, examples of the disclosure can also provide the user the ability to easily suspend or sign out from the persistent authentication.

Figure 1:
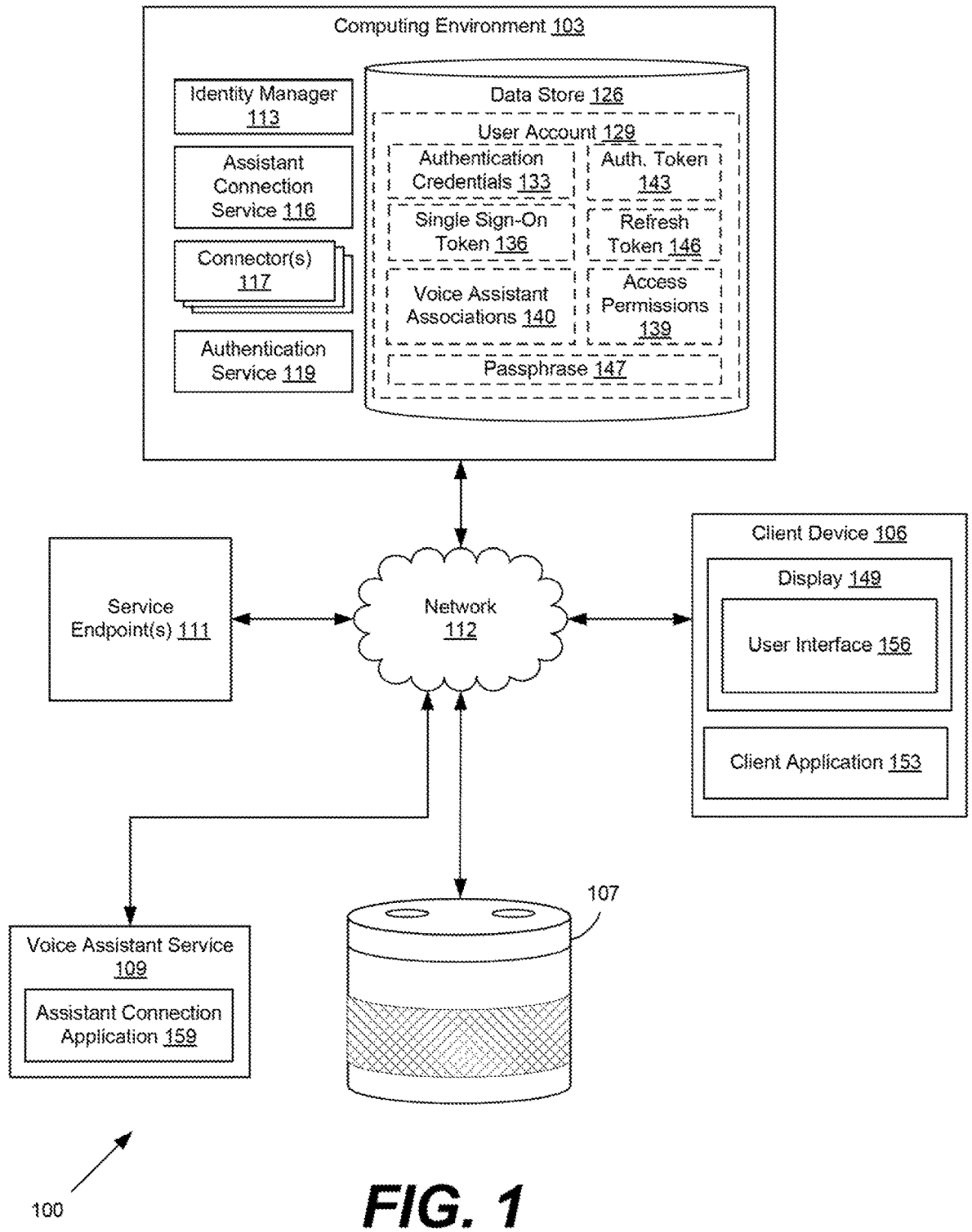
FIG. 1 is a schematic block diagram depicting an example of a network environment according to examples of the disclosure.

Beginning with FIG. 1, shown is an example of a networked environment 100. The networked environment 100 includes a computing environment 103, a client device 106, a voice assistant device 107, a voice assistant service 109, and one or more service endpoints 111, which are in data communication with each other across a network 112. The network 112 includes wide area networks (WANs) and local area networks (LANs). These networks can include wired or wireless components or a combination thereof. Wired networks can include Ethernet networks, cable networks, fiber optic networks, and telephone networks, such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (e.g., WI-FI®), BLUETOOTH® networks, microwave transmission networks, as well as other networks relying on radio broadcasts. The network 112 can also include a combination of two or more networks 112. Examples of networks 112 can include the Internet, intranets, extranets, virtual private networks (VPNs), and similar networks.

The computing environment 103 can include, for example, a server computer or any other system providing computing capability. Alternatively, the computing environment 103 can employ a plurality of computing devices that can be arranged, for example, in one or more server banks or computer banks or other arrangements. These computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103 according to various examples. The components executed in the computing environment 103, for example, can include an identity manager 113, an assistant connection service 116, one or more connectors 117, and an authentication service 119. In some examples, one or more service endpoints 111 can also be executed in the computing environment 103 in the case of service endpoints that are provided by the enterprise on the same computing resources of the enterprise. In some embodiments, however, one or more of the service endpoints 111 can be executed in a separate computing environment that is in communication with the computing environment 103 across the network 112.

Also, various data is stored in a data store 126 that is accessible to the computing environment 103. The data store 126 can be representative of a plurality of data stores, which can include relational databases, object-oriented databases, hierarchical databases, hash tables or similar key-value data stores, as well as other data storage applications or data structures. The data stored in the data store 126 is associated with the operation of the identity manager 113, the assistant connection service 116, the connector(s) 117, the authentication service 119, and one or more of the service endpoints 111, as well as potentially other applications or functional entities described later. This data can include one or more user accounts 129 and potentially other data.

The identity manager 113 can authenticate users and manage user authorizations or permissions to access applications, data, or other computing resources. For example, the identity manager 113 could correspond to a single sign-on portal that verifies a user's authentication credentials 133, issues a single sign-on token 136 that identifies the user, and verifies whether the user has the appropriate access permissions 139 to access one or more service endpoints 111. Examples of identity managers 113 include VMWARE's Identity Manager, Workspace ONE, or MICROSOFT's Active Directory Federation Services.

The authentication service 119 can retrieve and cache authentication data, such as authentication tokens 143 and refresh tokens 146, provided by various service endpoints 111. The cached authentication data can be used by the assistant connection service 116 to query the service endpoints 111 for information.

The assistant connection service 116 can facilitate authentication of users who are using an assistant device 107 with the identity manager 113. Additionally, the assistant connection service 116 can enable users to retrieve information from one or more service endpoints 111 for playback by a voice assistant device 107 that the user can associate with their user account 129 through the assistant connection service 116. The functionality of the assistant connection service 116 can also be implemented within a service endpoint 111.

A connector 117 can provide a standardized mechanism for the assistant connection service 116 to communicate with a service endpoint 111. Each service endpoint 111 may provide an application programming interface (API) for communicating, querying, or otherwise interacting with the service endpoint 111, which can include different methods or functions with different parameters compared to other service endpoints 111. This can allow for the assistant connection service 116 to send a single, uniformly formatted query to one or more connectors 117. Each connector 117 is then responsible for using the information provided in the query from the assistant connection service 116 to invoke the appropriate functions provided by the API of the service endpoint 111. To add support for a new service endpoint 111, a new connector 117 can be created without needing to modify the assistant connection service 116 itself. Likewise, if a change is made to the API of the service endpoint 111, the connector 117 between the assistant connection service 116 and the federated service can be updated without having to modify the assistant connection service 116 itself.

A service endpoint 111 can be web application, web service, or other network facing application that can be accessed using a shared identity manager 113. A service endpoint 111 can also provide its own authentication flow or mechanism rather than rely upon a shared identity manager 113. One or more service endpoints 111 can be provided by the same provider or by different providers.

The user account 129 represents information associated with a user. The information can include one or more authentication credentials 133, one or more single sign-on tokens 136, and/or one or more access permissions 139 applied to the user account, as well as cached authentication tokens 143 and refresh tokens 146. Voice assistant associations 140 can specify one or more voice assistant devices 107 that are associated with a user account 129 and with which a user has authenticated. Once a voice assistant association 140 is established by a user, the assistant connection service 116 can provide data from a service endpoint 111 for playback by the voice assistant device 107. Other information about the user can also be stored as part of the user account 129, such as the user's name or contact information.

The authentication credentials 133 represent the credentials that a user can present to the identity manager 113 to authenticate the user's identity. Authentication credentials 133 can include a combination of a username and password, a cryptographic certificate, a one-time password, or a combination of several of authentication credentials 133 as part of a multi-factor authentication schema. Examples of one-time passwords can include a one-time password generated using a version of the time-based one-time password algorithm (TOTP) or a one-time password generated using the HMAC-based one-time password (HOTP) algorithm.

The single sign-on (SSO) token 136 is a software token generated by the identity manager 113 in response to a successful authentication of the user with the identity manager 113 using the authentication credentials 133. The SSO token 136 can be used to provide a client device 106 access to various service endpoints 111 on behalf of the authenticated user. Additionally, the SSO token 136 can be used by the assistant connection service 116 to access various service endpoints 111 on behalf of the authenticated user and a voice assistant device 107 associated with the user. In some instances, such as those implementing a version of the KERBEROS protocol, a separate SSO token 136 can be generated for each service endpoint 111 that the client device 106 attempts to access on behalf of the user. In other instances, the single SSO token 136 can be generated and used to provide the client device 106 with access to several of the service endpoints 111. Although each of the service endpoints 111 can have a different set of authentication credentials 133 linked to the user account 129, such as a different user name and password combination, the SSO token 136 allows the user to authenticate once with the identity manager 113 in order to use each of the service endpoints 111 instead of having to authenticate with each of the service endpoints 111 separately.

The access permissions 139 represent computing resources that the user account is authorized to access. For example, the access permissions 139 can indicate that a user account is permitted to access some service endpoints 111 but is prohibited from accessing other service endpoints 111. As another example, the access permissions 139 can indicate that the user account 129 is allowed to access certain features of a service endpoint 111, but prohibited from accessing other features. For example, if one of the service endpoints 111 that a user was permitted to access was a customer relationship management (CRM) service, the user might have permission to access his or her own contacts but be prohibited from accessing the sales contacts of other users.

An authentication token 143 is a token provided by one of the service endpoints 111 in response to a successful authentication with the service endpoint 111. The authentication token 143 represents that a user account 129 is currently authenticated by the service endpoint 111 and authorized to access or otherwise interact with the service endpoint 111 in some capacity. For security purposes, the authentication token 143 often has a time-limit associated with it, such as 1 hour, 3 hours, 6 hours, 8 hours, or some other period of time. Once the time-limit has expired, the authentication token 143 can no longer be used to prove current authentication status of the user account 129 with the service endpoint 111. The authentication token 143 can be provided, for example, as part of an authentication exchange using a version of the OAUTH protocol.

Each service endpoint 111 can be associated with a federated user account. A user with a user account 129 may also have multiple federated user accounts. For example, a user may have one federated user account for each service endpoint 111 that the user is registered or enrolled with. As another example, the user may have multiple federated user accounts for a service endpoint 111 (e.g., a personal federated user account and a separate federated user account for business or professional purposes). The federated user account can be associated with an SSO token 136 and an authentication token 143.

A passphrase 147 is a token or password generated by the assistant connection service 116 and associated with a user account 129. The passphrase 147 can be generated as an expiring or one-time password. Examples of one-time passwords can include a one-time password generated using a version of the time-based one-time password algorithm (TOTP) or a one-time password generated using the HMAC-based one-time password (HOTP) algorithm. The passphrase can also be a multi word phrase in a spoken language that can be read out by the user according to examples of this disclosure. The passphrase 147 can be generated in response to a request from a user's client device 106 to associate a voice assistant device 107 with the user's user account 129. In examples of this disclosure, the user can be prompted to read out the passphrase 147, and the readout can be captured by a respective microphone or audio capture mechanism of the client device 106 and the voice assistant device 107 to verify that the user is in proximity to the voice assistant device 107.

Each service endpoint 111 can be associated with a federated user account 131. A user with a user account 129 may also have multiple federated user accounts. For example, a user may have one federated user account for each service endpoint 111 that the user is registered or enrolled with. As another example, the user may have multiple federated user accounts for a service endpoint 111 (e.g., a personal federated user account and a separate federated user account for business or professional purposes). The federated user account can be associated with an SSO token 136 and an authentication token 143.

The client device 106 is representative of a plurality of client devices 106 that can be coupled to the network 112. The client device 106 can include, for example, a processor-based system such as a computer system. Examples of these computer systems can include a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays 149, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as one or more client applications 153. The client application 153 can cause a user interface 156 to be rendered on the display 149. The client application 153 can represent various types of applications executable by the client device 106. For example, the client application 153 could be a web browser and the user interface 156 could include a web page rendered within a browser window. As another example, the client application 153 could be an email application and the user interface 156 could represent a graphical user interface for viewing, editing, and composing emails.

Additionally, the client application 153 can represent an application that facilitates user authentication with the authentication service 119 and the assistant connection service 116 so that a user can create an association between a voice assistant device 107 and her user account 129. The client device 106 can include one or more local area network interfaces, microphones, speakers, or cameras that facilitate communication with a voice assistant device 107.

The voice assistant device 107 represents a smart speaker or any device that has a microphone and audio playback capability to provide a voice assistant experience. A voice assistant experience means an experience in which a user can provide spoken commands or requests that are captured by one or more microphones integrated with or in communication with the voice assistant device 107, and the voice assistant device 107 play back audio using a speaker in response to the spoken commands or requests. For example, a user can ask the voice assistant device 107 to play music or retrieve information from the Internet, and the voice assistant device 107 can cause playback of the requested music or information through an integrated speaker or an audio playback device in communication with the voice assistant device 107.

The voice assistant service 109 can communicate with the voice assistant device 107 to process voice commands and facilitate retrieval of information for playback through the voice assistant device 107. The voice assistant service 109 can perform voice recognition or speech-to-text conversion on audio captured by the voice assistant device 107, identify a command or action to perform in response to the captured audio, and response to the voice assistant device 107 audio that should be played back through the voice assistant device 107. The voice assistant service 109 can also provide an API so that third parties can create applications or extend the capabilities of the voice assistant device 107. These applications or capabilities can be implemented within a cloud-based voice assistant service 109 so that the functionality does not need to be implemented within every voice assistant device 107 that is deployed in order for extended capabilities to be available to every user.

In the context of this disclosure, the assistant connection application 159 can facilitate authentication of a user with the assistant connection service 116 using the voice assistant device 107. Upon authentication, the assistant connection application 159 can retrieve data from the assistant connection service 116 or service endpoints 111 and cause at least a portion of the data to be played back through the voice assistant device 107. Accordingly, various commands can be implemented in the assistant connection application 159, such as commands to retrieve or make changes to data in a user's calendar, email, or other federated services.

Also in the context of this disclosure, any functionality discussed as being performed by the assistant connection application 159 or assistant connection service 116 can be performed in a single application or service. Additionally, any functionality discussed as being performed by the assistant connection application 159 can be performed instead by the assistant connection service 116 or vice-versa.

Next, a general description of the operation of the various components of the networked environment 100 is provided. To begin, a user of the client device 106 authenticates with the identity manager 113. For example, the identity manager 113 can generate and send a web page to a browser executing on the client device 106. The user can use the web page to submit his or her authentication credentials 133 to the identity manager 113. The identity manager 113 can then determine whether the submitted authentication credentials 133 match the authentication credentials 133 stored for the user account 129. If the authentication credentials 133 match, the identity manager 113 determines that the user is authenticated. In response, the identity manager 113 can generate an SSO token 136 to represent the authenticated user. In some embodiments, the identity manager 113 can also notify the authentication service 119 of the authentication event. In these embodiments, the notification can include a user identifier and the SSO token 136. In other embodiments, the identity manager 113 can instead provide the SSO token 136 to the client application 153 executing on the client device 106. In these embodiments, the client application then provides the SSO token 136 to the authentication service 119.

In some embodiments, the authentication service 119 can then authenticate the user with one or more of the service endpoints 111 in the background or upon the first request for data from a particular service endpoint 111. For example, the authentication service 119 can send the user's SSO token 136 to each service endpoint 111 that an access permission 139 indicates a user is authorized to access. In other instances, the authentication service 119 can send the user's SSO token 136 to every service endpoint 111 that is registered with the identity manager 113. In some embodiments, the SSO token 136 can be included in an authentication request that complies with a version of the OAUTH protocol.

The computing environment 103 can also verify that the user account 129 associated with the SSO token 136 is allowed to access the service endpoint 111. For example, the authentication service 119 or assistant connection service 116 can query the data store 126 to retrieve a username or other user identifier for the user account 129 associated with the single sign-on token 136. The computing environment 103 can then compare the retrieved username or other user identifier with its own list of registered or authorized users. If the retrieved username or other user identifier matches a username or user identifier stored in the list of registered or authorized users maintained by the service endpoint 111, then the computing environment 103 can determine that the user account 129 linked to the SSO token 136 is authorized to access the service endpoint 111. Upon successful authorization, the computing environment 103 can generate an authentication token 143 and a refresh token 146 and provide them to the authentication service 119. In some instances, the authentication token 143 and the refresh token 146 can be included in a response that complies with a version of the OAUTH protocol.

The authentication service 119 can then cache or otherwise store the authentication token 143 and the refresh token 146 for future use. The authentication service 119 can, for example, provide the authentication token 143 in response to requests from authorized applications. For example, the authentication service 119 can provide the authentication token 143 for the user in response to a request from the assistant connection service 116.

In addition, the authentication service 119 can automatically obtain a new authentication token 143 for the user when the current authentication token 143 expires or is about to expire. For example, the authentication service 119 can determine that the authentication token 143 was obtained 59 minutes ago, but is only valid for one hour. As another example, the authentication service 119 can determine that the authentication token 143 was obtained 61 minutes ago, but the authentication token 143 was only valid for one hour. In response to either example, the authentication service 119 can submit a second authentication request to the service endpoint 111. The second authentication request can include the refresh token 146.

In response, the service endpoint 111 can evaluate the refresh token 146 to determine whether the refresh token 146 is still valid. For example, the service endpoint 111 could evaluate the refresh token 146 to determine whether it has expired. As another example, the service endpoint 111 could evaluate the refresh token 146 to determine whether it has been revoked. If the refresh token 146 remains valid, the service endpoint 111 can then provide the authentication service 119 with a new authentication token 143. By storing authentication tokens 143 in the data store 126, the assistant connection service 116 can utilize the tokens to access data from one or more service endpoint 111 on behalf of the user.

Accordingly, a user might desire to use a voice assistant device 107 to access data from service endpoints 111. The voice assistant device 107 might be in a shared environment, such as a hotel, office, or other shared setting. Accordingly, the functionality associated with the assistant connection application 159 can provide a skill or capability that the user can invoke on the voice assistant device 107. The assistant connection application 159 can communicate with the assistant connection service 116 to make a determination as to whether a user account 129 is associated with a particular voice assistant device 107. Additionally, the assistant connection application 159 and assistant connection service 116 can exchange communications that enable the voice assistant device 107 to play back data requested by the user.

The assistant connection application 159 can be invoked by the user through a keyword spoken by the user. For example, the user can speak "Assistant, please open enterprise workspace." The keyword "enterprise workspace," or any other keyword, can be associated with the assistant connection application 159 within the assistant ecosystem. When the user invokes the assistant functionality on the voice assistant device 107 and speaks a particular keyword, the assistant connection application 159 can be launched by voice assistant service 109.

The assistant connection application 159 can be instrumented to obtain data from particular service endpoints 111 on behalf of a user. For example, if the user requests data from her calendar, email, contacts, or other service endpoints 111, the assistant connection application 159 can obtain the requested data through the assistant connection service 116. However, the user must first authenticate her user account 129 using the voice assistant device 107 so that the assistant connection service 116 will provide the requested data from a particular service endpoint 111. Upon authenticating, the user can then access data from service endpoints 111 that are supported by the assistant connection application 159 and the assistant connection service 116.

Figure 2:
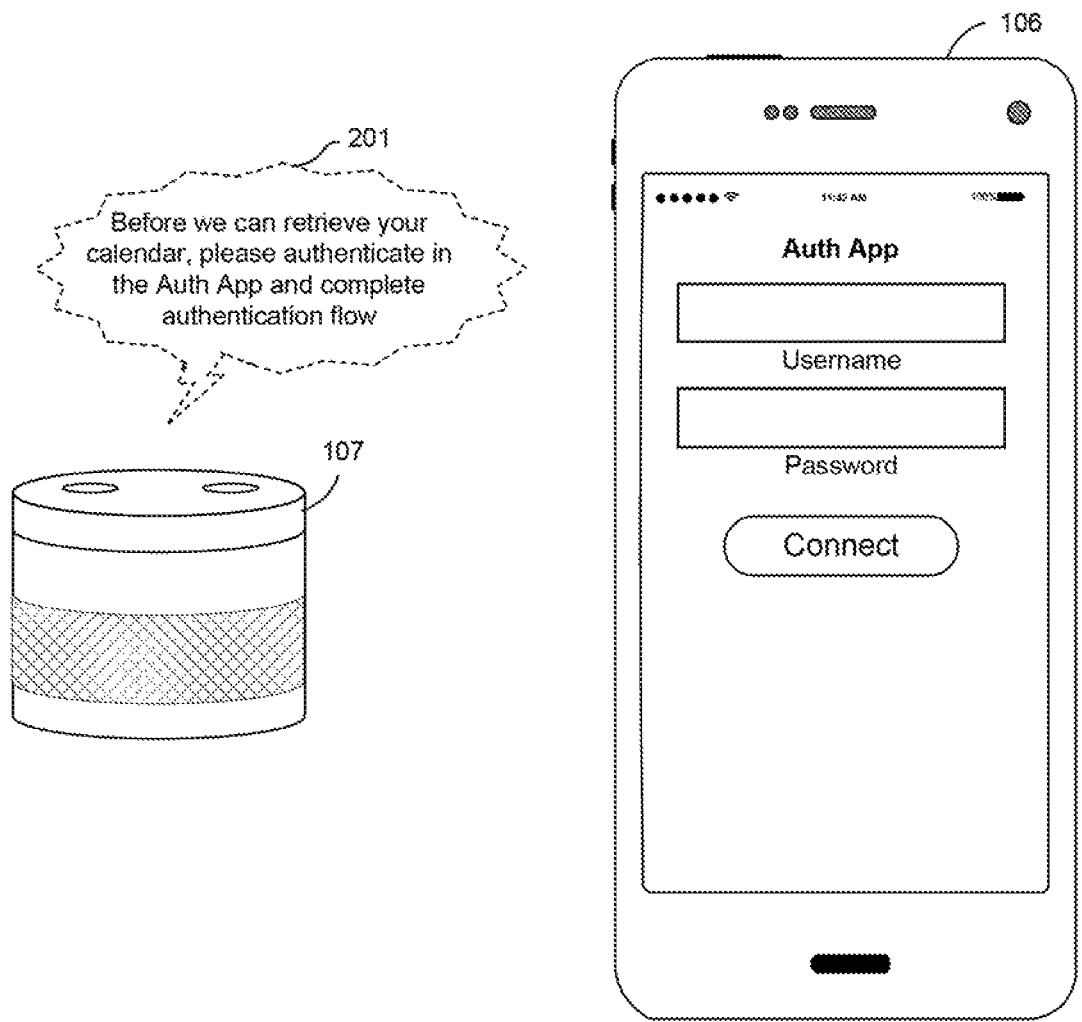
FIG. 2 depicts a scenario according to examples of the disclosure.

Referring next to FIG. 2, shown is a scenario that illustrates how interactions between a user, the voice assistant device 107, and the user's client device 106 can operate. In the scenario shown, the user has invoked the functionality in the voice assistant device 107 that is provided by the assistant connection application 159. Again, the assistant connection application 159 can be implemented using APIs provided by an assistant platform on which the voice assistant device 107 runs. The assistant connection application 159 can be implemented as a third party application, skill, or capability of the voice assistant device 107 that extends the capability of the voice assistant device 107 to enable users to obtain data from service endpoints 111 associated with the user account 129.

In FIG. 2, the user can ask the voice assistant device 107 to launch or invoke the assistant connection application 159 by using a keyword linked to the assistant connection application 159 within an assistant ecosystem in which the voice assistant device 107 operates. The user can request that the voice assistant device 107 retrieve data from the user's calendar, email, task list, or another service endpoint 111 for which access is authenticated by the identity manager 113. Upon launching the assistant connection application 159, the user can either request that the assistant connection application 159 authenticate her user account 129 or access data from a service endpoint 111 linked to her enterprise account. The assistant connection application 159 can identify the voice assistant device 107 from which the request is originating and determine whether the voice assistant device 107 is linked to a user account 129 in the data store 126. If the voice assistant device 107 is not linked with a voice assistant association 140 of a user account 129, the assistant connection application 159 can cause the voice assistant device 107 to play back a message 201 that tells the user that authentication is required before data can be retrieved from a service endpoint 111.

The message 201 can instruct the user to launch a particular application on a client device 106. The application can be a single sign-on application that is used by the enterprise to facilitate single sign-on functionality for other apps and service endpoints 111 that the user might access through a smartphone, personal computer, or other device. The application on the client device 106 can allow the user to authenticate with the identity manager 113 and obtain SSO tokens that other apps on the client device 106 can utilize to authenticate the user's identity to service endpoints 111.

Accordingly, a client application 153 on the client device can also facilitate authentication of the user through the voice assistant device 107 so that the voice assistant device 107 is linked with the user account 129 of the user. Once authentication has been established through the client application 153, the user can then request the voice assistant device 107 to obtain data from service endpoints 111 of the user. As shown in FIG. 2 and described in further detail herein, the user can provide his or her credentials to a client application 153, which authenticates her identity with the identity manager 113. The credentials can take the form of a username and password, biometric credentials, a one-time password, or other credentials. In some cases, the user may have previously authenticated her identity with the identity manager 113 using the client application 153 to access applications or service endpoints 111 on the client device.

In some scenarios, the user may have already provided her authentication credentials to the client application 153 and authenticated herself to the identity manger 113, assistant connection service 116, or a management service. In this scenario, the user can simply launch the client application 153 and initiate a flow that associates the voice assistant device 107 with the user account 129 of the user using a passphrase 147.

Figure 3:
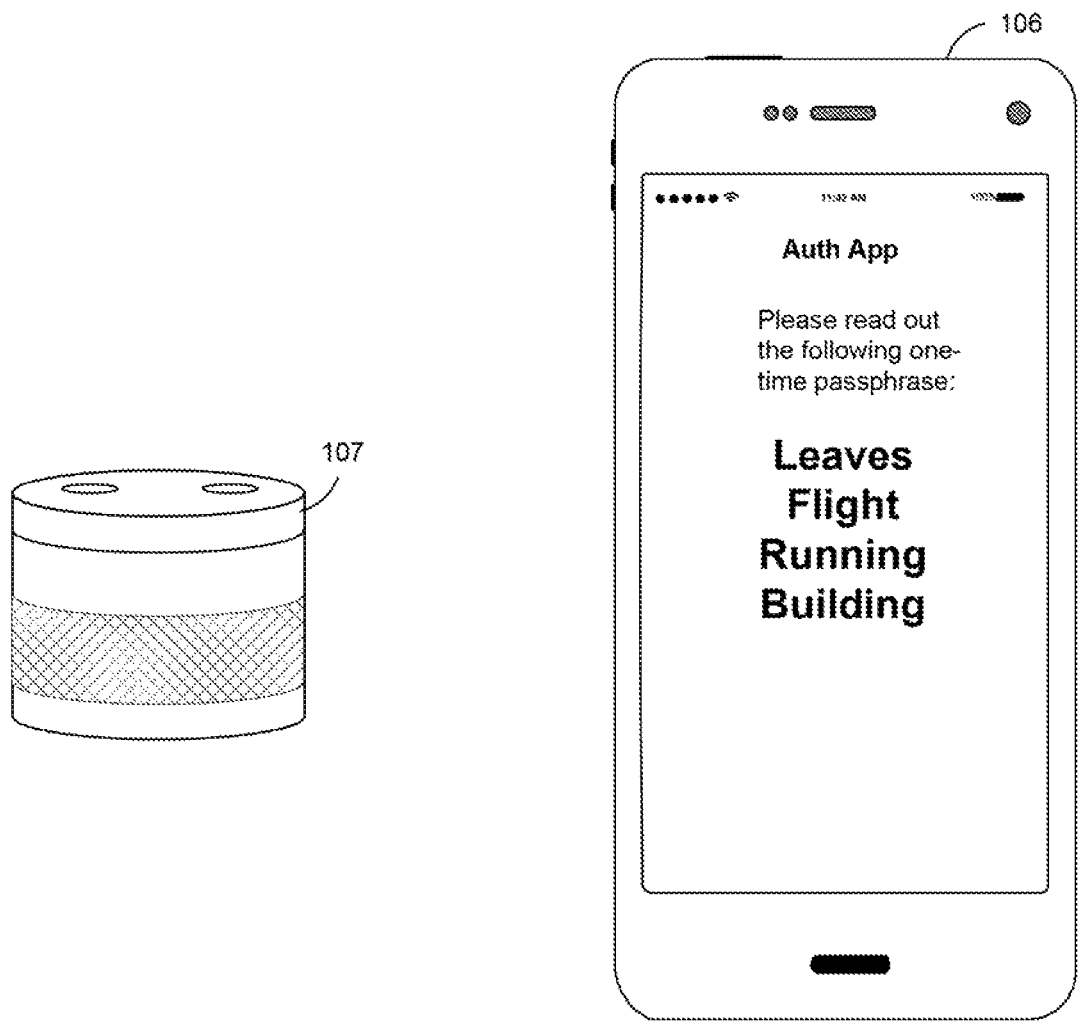
FIG. 3 depicts a scenario according to examples of the disclosure.

Referring next to FIG. 3, shown is a user interface that illustrates how the user can establish an association between the voice assistant device 107 and the user account 129. In the example of FIG. 3, the user has activated functionality through a user interface or a voice command to initiate authentication through the voice assistant device 107. In response, the assistant connection service 116 can generate a passphrase 147 that is associated with the user account 129. The passphrase 147 can be unique with respect to other passphrases 147 in the data store 126. The passphrase 147 can comprise a temporary password that expires after an expiry time period that can be read out or read aloud by the user.

In some examples, the passphrase 147 can be generated by the client application 153 using a shared secret or timestamp and is exchanged or synchronized between the client device 106 and the assistant connection service 116. The passphrase 147 can then be provided to the assistant connection service 116 and stored in the data store 126.

Upon authenticating her identity with the client application 153, the user can initiate an assistant authentication flow within the client application 153 on the client device. The assistant authentication flow can communicate with the assistant connection service 116 to create an association between the voice assistant device 107 and the user account 129 using the generated passphrase 147. The assistant connection application 159 can cause the voice assistant device 107 to instruct the user to launch the client application 153 and initiate the authentication workflow. The authentication workflow can have a button or toggle that starts the authentication process.

Starting the authentication process can cause the assistant connection application 159 to enter a listening mode or start a listening process that listens for a readout of the passphrase 147 by the user. Starting the authentication process can also start a listening process whereby the client application 153 listens for a readout of the passphrase 147 as well. The assistant connection service 116 can transmit the generated passphrase 147 to the client application 153 and cause the client application 153 to prompt the user to read aloud the passphrase 147.

The assistant connection application 159 and the client application 153 can capture the readout of the passphrase 147 by the user. Using the audio from the readout of the passphrase 147, the assistant connection service 116 can authenticate the user with the voice assistant device 107. The assistant connection application 159 can generate an audio signature of the audio associated with the readout. The assistant connection application 159 can perform a speech-to-text conversion of the readout and extract the passphrase 147 from the audio. In some examples, the assistant connection application 159 can capture audio associated with the readout and provide the raw or processed audio to the assistant connection service 116, which can extract the passphrase 147 and generate the audio signature.

Similarly, the client application 153 can generate an audio signature of the audio associated with the readout. The client application 153 can perform a speech-to-text conversion of the readout and extract the passphrase 147 from the audio. In some examples, the client application 153 can capture audio associated with the readout and provide the raw or processed audio to the assistant connection service 116, which can extract the passphrase 147 and generate the audio signature.

In this sense, the assistant connection service 116 can receive a representation of the readout of the passphrase 147 as captured by the client application 153 and assistant connection application 159. The representation can be the raw audio captured by the respective microphone systems of the devices. The representation can also be an audio signature generated by the devices from the captured audio. The representation can also include an extracted passphrase 147 that is extracted from the captured audio.

The assistant connection service 116, upon receiving the audio, passphrase 147, and/or the audio signature from the assistant connection application 159 on behalf of a voice assistant device 107, can determine whether a passphrase 147 that is unexpired is associated with a user account 129 and matches the passphrase 147 captured by the voice assistant device 107. If so, then the assistant connection service 116 can determine whether a corresponding audio, passphrase 147 and/or audio signature has also been received from the client application 153 that matches the audio and/or passphrase 147 captured by the voice assistant device 107. By comparing an audio signature that is generated from the audio captured by the client application 153 and voice assistant device 107, respectively, the identity manager 113 can verify that the client device 106 is in the same room or in proximity to the voice assistant device 107 because the ambient and background noise that is picked up in the audio will be represented in the audio signature.

Accordingly, if audio containing the passphrase 147 is received from a voice assistant device 107 that does not have an audio signature that matches audio received from the client application 153, the user will not be authenticated. Additionally, if audio containing a passphrase 147 is received from a voice assistant device 107 that is never received from the client application 153, the user will not be authenticated.

Upon validation of a passphrase 147 and an audio signature of audio captured by the voice assistant device 107 and the client application 153, the assistant connection service 116 can create a voice assistant association 140 that is linked to the user account 129. The voice assistant association 140 indicates that the user has been authenticated through the voice assistant device 107. Authentication has occurred because audio containing a readout of the passphrase 147 has been captured by the client application 153 and voice assistant device 107 and validated by the assistant connection service 113 as matching one another according to an audio signature calculation performed on both audio captures. In some examples, in addition to validating the existence of the passphrase 147, by validating the audio signature, the assistant connection service 116 validates that background and/or ambient noise captured by the voice assistant device 107 and the client device 106 are present in the audio captured by both devices. By validating the audio signatures, the assistant connection service 116 can verify that the client device 106, from which the user has authenticated his identity, is in proximity to the voice assistant device 107. Additionally, because the passphrase 147 is also validated and its creation was initiated from the client application 153 on the client device 106, validation that the user initiated the authentication flow can be established.

Figure 4:
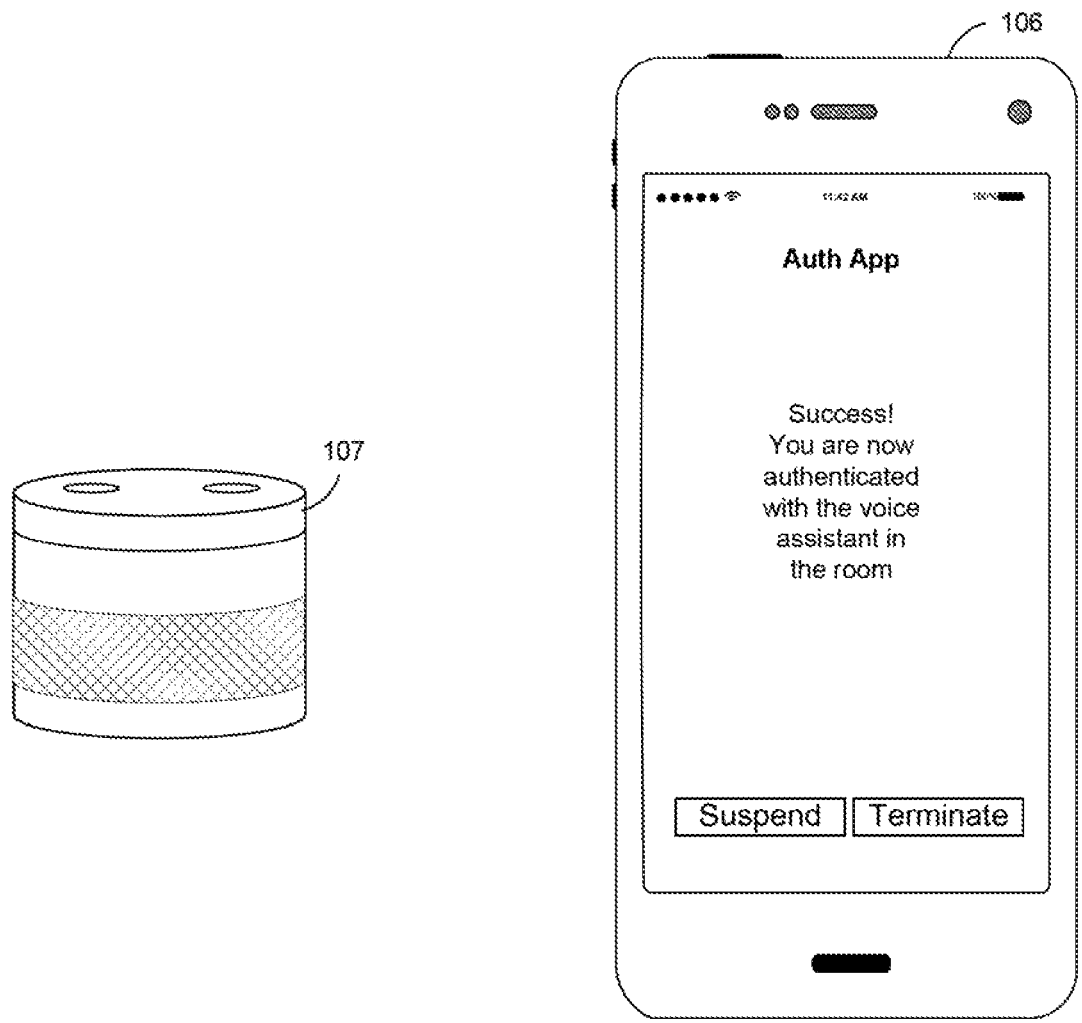
FIG. 4 depicts a scenario according to examples of the disclosure.

As shown in FIG. 4, the user can also suspend or terminate the association between the user account 129 and the voice assistant device 107 using the client application 153. If the user activates a suspend option in the client application 153, the client application 153 can send an indication to temporarily suspend the voice assistant association 140 linking the user account 129 and the voice assistant device 107 until the user activates a resume button in the client application 153. While the suspension is in effect, the assistant connection application 159 or assistant connection service 116, in response to a request from the voice assistant device 107 or the user for data from a service endpoint 111, can reply with a response that the requested is unavailable due to the suspension being in effect.

The client application 153 can also allow the user to terminate or destroy the voice assistant association 140 linking the user account 129 and the voice assistant device 107 through a user interface presented in the client application 153. After termination of the voice assistant association 140, in response to a subsequent request from the voice assistant device 107 or the user for data from a service endpoint 111, the assistant connection application 159 or assistant connection service 116 can reply with a response that the user should authenticate before data from a service endpoint 111 can be retrieved using the voice assistant device 107.

Figure 5:
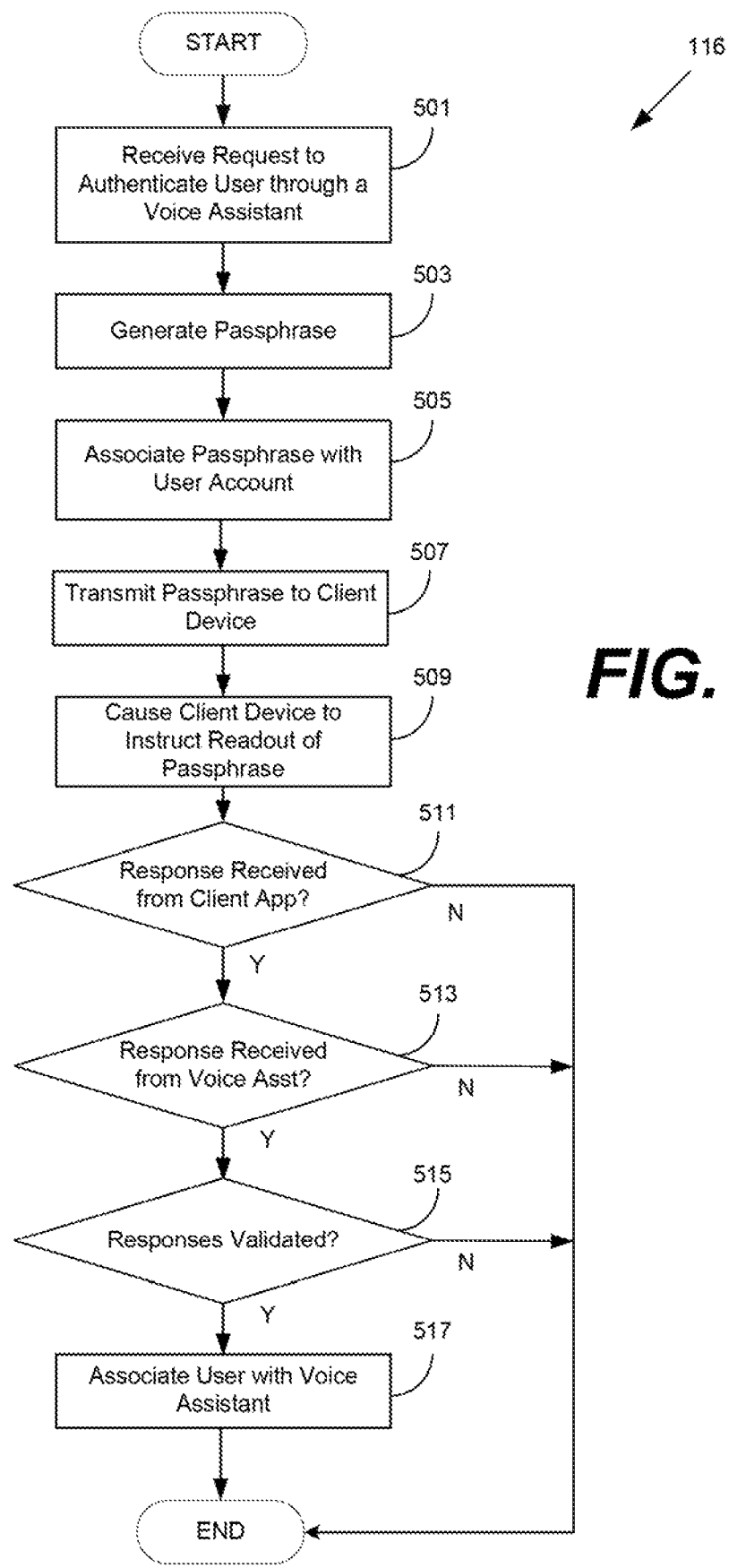
FIG. 5 is a flow chart depicting the operation of an example of a component of the client device of the network environment of FIG. 1.

FIG. 5 is a flowchart depicting an example of the operation of a portion of the assistant connection service 116. It is understood that the flowchart of FIG. 5 provides merely an example of the many different types of functional arrangements that can be employed to implement the portion of the assistant connection service 116 as described herein. As an alternative, the flowchart of FIG. 5 can be viewed as depicting an example of elements of a method implemented by the assistant connection service 116 in some implementations.

Beginning at step 501, the assistant connection service 116 can receive a request to authenticate a user on behalf of a voice assistant device 107. The request can be received from the client application 153 executed by a client device 106. The flowchart of FIG. 5 assumes that the user has authenticated his or her identity by providing a username, password, or other credentials that are needed to authenticate the user with the identity manager 113. The flowchart of FIG. 5 also assumes that the user has invoked the assistant connection application 159 or a listening mode on the voice assistant device 107.

At step 503, the assistant connection service 116 can generate a passphrase 147 and associate the passphrase 147 with the user account 129 associated with the client device 106. The passphrase can be a temporary password or passphrase that the user can read aloud. Examples of one-time passwords can include a one-time password generated using a version of the time-based one-time password algorithm (TOTP), the HMAC-based one-time password (HOTP) algorithm, or another passphrase 147 that can be associated with an expiry time period.

At step 505, the assistant connection service 116 can associate the passphrase 147 with the user account 129. As noted above, the flowchart of FIG. 5 assumes that the user has previously authenticated his identity with the identity manager 113 using the client application 153 or another application on the client device 106. By associating the passphrase 147 with the user account, authentication of the user through the assistant connection service 116 can also be facilitated.

At step 507, the assistant connection service 116 can transmit the passphrase 147 to the client device 106. The assistant connection service 116 can cause the client application 153 to display the passphrase 147 and/or an indication to read out the passphrase.

At step 509, the assistant connection service 116 can also cause the client application 153 prompt the user in a user interface to read the passphrase 147 aloud. Additionally, the assistant connection application 159 can cause the client application 153 and/or the voice assistant device 107 to enter a listening mode whereby the application listens for a readout of the passphrase 147 by the user.

At step 511, the assistant connection service 116 can determine whether a response that includes an audio signature or an audio file of captured audio is received from the client application 153. The audio can contain the passphrase 147 as well as background or ambient noise in the room or area in which the client device 106 is located. In some examples, the passphrase 147 and an audio signature can be received from the client application 153. If no response is received within a timeout period, the process can proceed to completion and the user will not be associated with a voice assistant device 107. Otherwise, the process can proceed to step 513.

At step 513, the assistant connection service 116 can determine whether a response that includes the passphrase 147, an audio signature, an audio file of captured audio or any combination thereof is received from the voice assistant device 107. The audio can contain the passphrase 147 as well as background or ambient noise in the room or area in which the voice assistant device 107 is located. If no response is received within a timeout period, the process can proceed to completion and the user will not be associated with a voice assistant device 107. Otherwise, the process can proceed to step 515.

At step 515, the assistant connection service 116 can validate the responses received from the client application 153 and the voice assistant device 107. To validate the responses, the assistant connection service 116 can determine whether the passphrase 147 is contained within audio received from a voice assistant device 107. If the passphrase 147 is received from a voice assistant device 107, the assistant connection service 116 can determine whether the passphrase 147 is also received in audio captured by the client application 153. Additionally, the assistant connection service 116 can validate an audio signature of the audio respectively captured by the voice assistant device 107 and the client application 153. The validation can comprise verifying that the audio signatures match one another. The audio signature can represent a signature that is calculated or generated from the audio respectively captured by the voice assistant device 107 and the client application 153. If the responses are validated, the process can proceed to step 517. Otherwise, the process can proceed to completion.

At step 517, the assistant connection service 116 can associate the voice assistant device 107 with the user account 129. A voice assistant association 140 can identify a voice assistant device 107 with which a user has authenticated. When a voice assistant association 140 is created for a user account 129, the assistant connection service 116 can permit requests from the voice assistant device 107 to retrieve data from service endpoints 111 associated with the user account 129. Thereafter, the process can proceed to completion.

The flowchart of FIG. 5 shows examples of the functionality and operation of implementations of components described herein. The components described herein can include hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowchart of FIG. 5 shows a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all variations are within the scope of the present disclosure.

The components described herein can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or more processors of the processing circuit.

The components described herein can be embodied in the form of hardware, as software components that are executable by hardware, or as a combination of software and hardware. If embodied as hardware, the components described herein can be implemented as a circuit or state machine that employs any suitable hardware technology. This hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as magnetic, optical, semiconductor, or other suitable media. Examples of a suitable computer-readable media include, but are not limited to, solid-state drives, magnetic drives, and flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All modifications and variations are intended to be included herein within the scope of this disclosure.

What is claimed is:

1. A system for authenticating a user with a service account through a voice assistant, comprising:
   at least one computing device;
   at least one application that, when executed by the at least one computing device, causes the at least one computing device to at least:
   receive a request to authenticate a user on behalf of a voice assistant;
   identify the voice assistant;
   identify a user account associated with the request;
   determine whether the voice assistant is linked with the user account;
   based at least in part on determining that the voice assistant is not linked with the user account, cause a client device to initiate an authentication flow that authenticates a user account associated with a user, the authentication flow requiring the user to authenticate the user account with an identity manager using a client application on the client device, wherein the authentication flow is performed on the client device separate from a voice assistant device executing the voice assistant, and wherein the client device and the voice assistant are in a listening mode to capture audio to capture a readout of the passphrase from a user, the passphrase being independently generated on the client device based upon a shared secret;
   obtain a first representation of the readout of the passphrase from the voice assistant, wherein the first representation corresponds to a first audio capture of the readout by the voice assistant;
   obtain a second representation of the readout from the client device, wherein the second representation corresponds to a second audio capture of the readout by the client device; and
   associate the user account with the voice assistant in response to validating that the first representation and the second representation match one another.

2. The system of claim 1, wherein the passphrase is a temporary one-time password that expires after an expiry time period.

3. The system of claim 1, wherein the at least one application further causes the client device to display a prompt to readout the passphrase.

4. The system of claim 1, wherein the first representation or the second representation comprises an audio signature generated from audio captured by the voice assistant or the client device.

5. The system of claim 4, wherein the audio signature comprises background noise contained within the audio captured by the voice assistant or the client device.

6. The system of claim 1, wherein the first representation or the second representation comprises audio captured by the voice assistant or the client device, and the at least one application further causes the at least one computing device to generate an audio signature based upon the audio.

7. The system of claim 1, wherein the instructions, when executed by the at least one computing device, cause the computing device to validate the first representation and the second representation by determining that the client device is in proximity to the voice assistant based upon an audio signature of the first representation matching an audio signature of the second representation.

8. A non-transitory computer-readable medium comprising machine-readable instructions, wherein the instructions, when executed by at least one processor, cause a computing device to at least:
   receive a request to authenticate a user on behalf of a voice assistant;
   identify the voice assistant;
   identify a user account associated with the request;
   determine whether the voice assistant is linked with the user account;
   based at least in part on determining that the voice assistant is not linked with the user account, cause a client device to initiate an authentication flow that authenticates a user account associated with a user, the authentication flow requiring the user to authenticate the user account with an identity manager using a client application on the client device, wherein the authentication flow is performed on the client device separate from a voice assistant device executing the voice assistant, and wherein the client device and the voice assistant are in a listening mode to capture audio to capture a readout of the passphrase from a user, the passphrase being independently generated on the client device based upon a shared secret;
   obtain a first representation of the readout of the passphrase from the voice assistant, wherein the first representation corresponds to a first audio capture of the readout by the voice assistant;

obtain a second representation of the readout from the client device, wherein the second representation corresponds to a second audio capture of the readout by the client device; and associate the user account with the voice assistant in response to validating that the first representation and the second representation match one another.

9. The non-transitory computer-readable medium of claim 8, wherein the passphrase is a temporary one-time password that expires after an expiry time period.

10. The non-transitory computer-readable medium of claim 8, wherein the instructions further cause the client device to display a prompt to readout the passphrase.

11. The non-transitory computer-readable medium of claim 8, wherein the first representation or the second representation comprises an audio signature generated from audio captured by the voice assistant or the client device.

12. The non-transitory computer-readable medium of claim 11, wherein the audio signature comprises background noise contained within the audio captured by the voice assistant or the client device.

13. The non-transitory computer-readable medium of claim 8, wherein the first representation or the second representation comprises audio captured by the voice assistant or the client device, and the instructions further cause the at least one computing device to generate an audio signature based upon the audio.

14. The non-transitory computer-readable medium of claim 8, wherein the instructions, when executed by the at least one processor, cause the computing device to validate the first representation and the second representation by determining that the client device is in proximity to the voice assistant based upon an audio signature of the first representation matching an audio signature of the second representation.

15. A method comprising:
  receiving a request to authenticate a user on behalf of a voice assistant;
  identifying the voice assistant;
  identifying a user account associated with the request;
  determining whether the voice assistant is linked with the user account;
  based at least in part on determining that the voice assistant is not linked with the user account, causing a client device to initiate an authentication flow that authenticates a user account associated with a user, the authentication flow requiring the user to authenticate the user account with an identity manager using a client application on the client device, wherein the authentication flow is performed on the client device separate from a voice assistant device executing the voice assistant, and wherein the client device and the voice assistant are in a listening mode to capture audio to capture a readout of the passphrase from a user, the passphrase being independently generated on the client device based upon a shared secret;
  obtaining a first representation of the readout of the passphrase from the voice assistant, wherein the first representation corresponds to a first audio capture of the readout by the voice assistant;
  obtaining a second representation of the readout from the client device, wherein the second representation corresponds to a second audio capture of the readout by the client device; and
  associating the user account with the voice assistant in response to validating that the first representation and the second representation match one another.

16. The method of claim 15, wherein the passphrase is a temporary one-time password that expires after an expiry time period.

17. The method of claim 15, further comprising causing the client device to display a prompt to readout the passphrase.

18. The method of claim 15, wherein the first representation or the second representation comprises an audio signature generated from audio captured by the voice assistant or the client device.

19. The method of claim 18, wherein the audio signature comprises background noise contained within the audio captured by the voice assistant or the client device.

20. The method of claim 15, wherein the first representation or the second representation comprises audio captured by the voice assistant or the client device, and the method further comprises generating an audio signature based upon the audio.

* * * * *